(12) United States Patent
Chih

(10) Patent No.: US 6,647,866 B1
(45) Date of Patent: Nov. 18, 2003

(54) PROCESSING DEVICE FOR COFFEE BEANS

(76) Inventor: Chen Kuo Chih, PO Box 82-144, Taipei (TW)

( * ) Notice: Subject to any disclaimer, the term of this patent is extended or adjusted under 35 U.S.C. 154(b) by 0 days.

(21) Appl. No.: 10/392,938

(22) Filed: Mar. 21, 2003

(51) Int. Cl.[7] .............................. A23L 1/18; A23N 12/00; A47J 31/42; A47J 37/04; F26B 3/08
(52) U.S. Cl. .............................. 99/348; 99/355; 99/286; 99/323.4; 99/323.7; 99/427; 99/469; 99/476; 99/483; 99/519; 99/600; 34/48; 34/225; 34/233; 34/549; 34/594
(58) Field of Search .......................... 99/286, 352–355, 99/467–476, 348, 483, 323.4, 323.5, 323.7, 427, 518–524, 600–610, 617–621; 34/48, 54, 63, 67, 72, 77, 79, 82, 57 E, 133, 225, 233, 360, 494, 394, 507, 549, 550, 564, 576, 577, 586, 594, 596, 606; 219/400, 492, 494, 502, 385; 426/466, 467, 469

(56) References Cited

U.S. PATENT DOCUMENTS

| | | | | |
|---|---|---|---|---|
| 3,747,511 A | * | 7/1973 | Palyi ............................ | 99/516 |
| 3,766,847 A | * | 10/1973 | Palyi ............................ | 99/484 |
| 4,271,603 A | * | 6/1981 | Moore, III ................. | 34/233 X |
| 4,329,371 A | * | 5/1982 | Hart ......................... | 426/481 X |
| 4,658,712 A | * | 4/1987 | Spencer ..................... | 99/622 X |
| 4,860,461 A | * | 8/1989 | Tamaki et al. ............. | 99/286 X |
| 4,871,901 A | * | 10/1989 | Igusa et al. .............. | 291/400 X |
| 4,949,632 A | * | 8/1990 | Porzi ......................... | 99/483 X |
| 4,978,078 A | * | 12/1990 | Vadnay ...................... | 99/605 X |
| 5,394,792 A | * | 3/1995 | Satake et al. ................. | 99/519 |
| 5,476,036 A | * | 12/1995 | Liebing ..................... | 99/524 X |
| 5,542,616 A | * | 8/1996 | Archer ........................ | 241/62 |
| 5,564,331 A | * | 10/1996 | Song ......................... | 99/355 X |

* cited by examiner

Primary Examiner—Timothy F. Simone
(74) Attorney, Agent, or Firm—Leong C. Lei

(57) ABSTRACT

A processing device for coffee beans to undergo a de-husking, bean-halving, membrane removing and roasting device to proceed with a de-husking, bean-halving, membrane removing and roasting step of coffee beans, wherein the de-husking, bean-halving and membrane-removing device comprises: a first beating mechanism having a plurality of rotating blades with hard rubber at the surface thereof to beat and remove the dried husk, flesh and inner skin of coffee beans; a second beating mechanism having a plurality of rotating blades with soft rubber at the surface thereof to beat and remove the silvery skin of the inner layer of the bean; a first separating mechanism mounted with a lower for separating the coffee bean from skin and debris; and the roasting device including a rolling container mounted with a spiral conductive plate and a burner at the bottom section of the rolling container for roasting of coffee beans after the coffee beans have been de-husked, halved and membrane-removed for appropriate stiring for evenly roasting.

13 Claims, 11 Drawing Sheets

PROCESSING DEVICE FOR COFFEE BEANS

BACKGROUND OF THE INVENTION (a) Technical Field of the Invention

The present invention relates to a coffee bean processing device, and in particular, a grinding device for coffee beans which allows the de-husking, bean-halving, membrane separating, roasting and grinding process to produce coffee powder.

(b) Description of the Prior Art

Conventionally, the de-husking process, flesh removal and skin removal of coffee beans are done manually. Needless to say, the production efficiency is extremely low as the processes are laborious and time-consuming. As a result, the cost of production is high and in some cases, where the processes are delayed, the quality of coffee beans thus obtained is acidic.

Further, conventional coffee bean roasting device, comprises a rotating cylinder and a burner heated from the below of the cylinder. In the course of rotating of the cylinder, the coffee beans within the cylinder cannot be effectively roasted and the beans at the bottom section of the cylinder may be overly roasted and those at the upper section may not be sufficiently roasted. The resulting of the roasting process using the conventional coffee bean roasting machine is that the coffee beans are not evenly roasted.

Generally, the roasted coffee beans are ground once by a coffee bean grinding device and it is possible that the beans are not evenly ground. Further, the thin membranes adhered onto the coffee beans are ground together with the coffee beans and therefore the quality of the ground coffee powder is affected. The conventional coffee bean grounding device can only provide a fixed size of coffee powder and over time, the grounding tool of the grounding machine will be worn out and the gap on the grinding tool bean-halving the size of coffee powder will become rather coarse and the coffee produced using the grounded powder may not taste good. Generally, the crushing of coffee beans, and grinding of the coffee beans are done within a grinding room, and thus the powder thus obtained may contain debris which affects the quality of the coffee powder. Thus, it is an object of the present invention to provide a coffee bean grinding device which can mitigate the above drawbacks.

SUMMARY OF THE INVENTION

Accordingly, it is an object of the present invention to provide a processing device for coffee beans to undergo a de-husking, bean-halving, membrane removing and roasting device to proceed with a de-husking, bean-halving, membrane removing and roasting step of coffee beans, wherein the de-husking, bean-halving and membrane-removing device comprises a first beating mechanism having a plurality of rotating blades with hard rubber at the surface thereof to beat and remove the dried husk, flesh and inner skin of coffee beans; a second beating mechanism having a plurality of rotating blades with soft rubber at the surface thereof to beat and remove the silvery skin of the inner layer of the bean; a first separating mechanism mounted with a blower for separating the coffee bean from skin and debris; and the roasting device including a rolling container mounted with a spiral conductive plate and a burner at the bottom section of the rolling container for roasting of coffee beans after the coffee beans have been de-husked, halved and membrane-removed for appropriate stiring for evenly roasting.

Yet a further object of the present invention is to provide a processing device for coffee beans to undergo a de-husking, bean-halving, membrane removing and roasting device to proceed with a de-husking, bean-halving, membrane removing and roasting step of coffee beans, wherein the de-husking, bean-halving and membrane-removing device comprises a first beating mechanism having a plurality of rotating blades with hard rubber at the surface thereof to beat and remove the dried husk, flesh and inner skin of coffee beans; a second beating mechanism having a plurality of rotating blades with soft rubber at the surface thereof to beat and remove the silvery skin of the inner layer of the bean; a first separating mechanism mounted with a blower for separating the coffee bean from skin and debris; the roasting device including a rolling container mounted with a spiral conductive plate and a burner at the bottom section of the rolling container for roasting of coffee beans after the coffee beans have been de-husked, halved and membrane-removed for appropriate stirring for evenly roasting; the grinding device including a coarse grinding mechanism having an upper and lower grinding disc and a gap being formed by the upper and lower grinding disc to grind coffee beans into coarse granules and to remove the thin membrane adhered to the coffee beans; a second separating mechanism having a blower which can separate crushed granules of the coffee and the thin membrane; a fine grinding mechanism having an upper and lower grinding disc and a gap being formed by the upper and lower grinding disc to form a small gap to grind the crushed granules into fine powder.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon maling reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
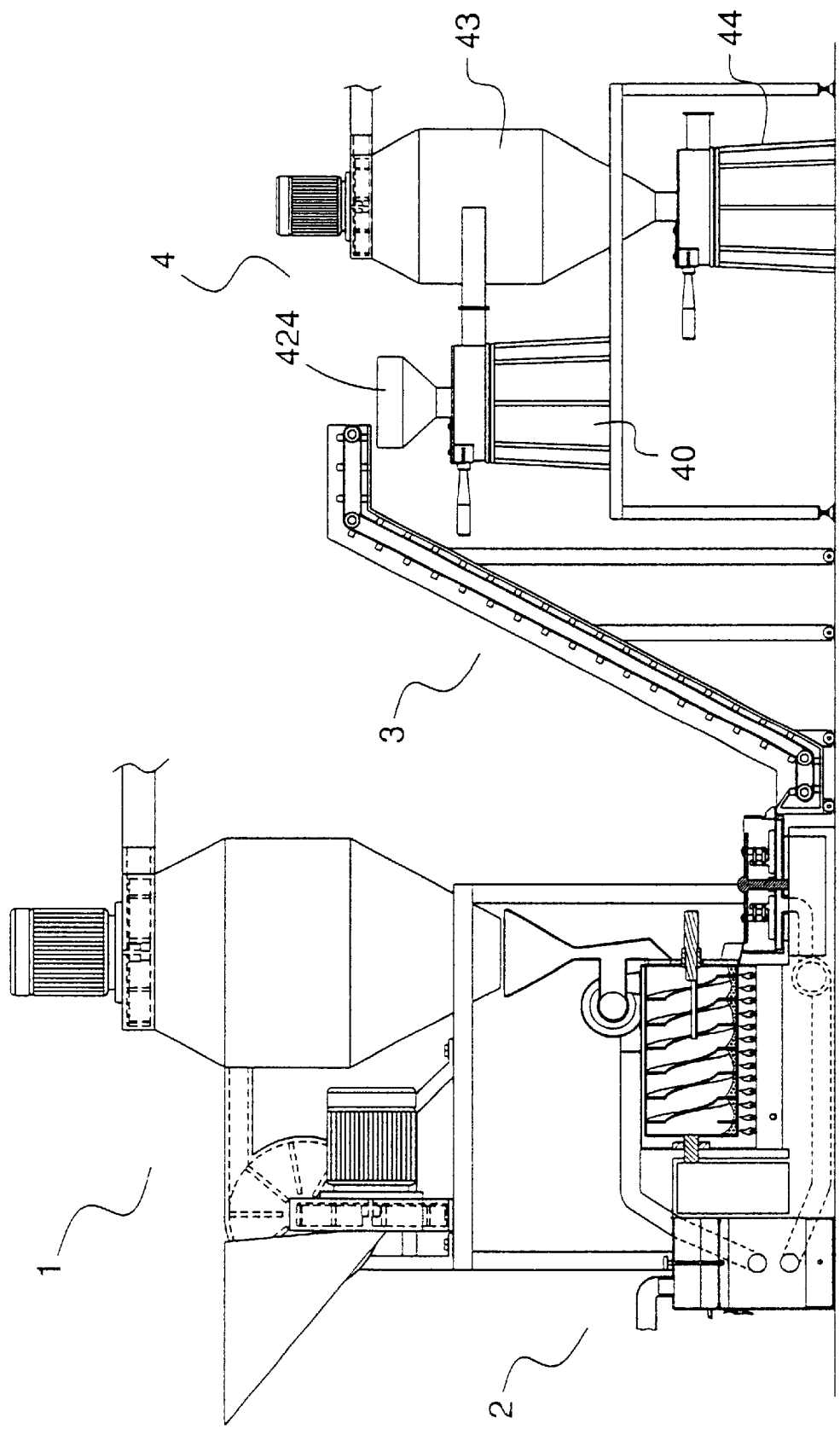
FIG. 1 is a schematic view of coffee bean processing device of the present invention.
Figure 2:
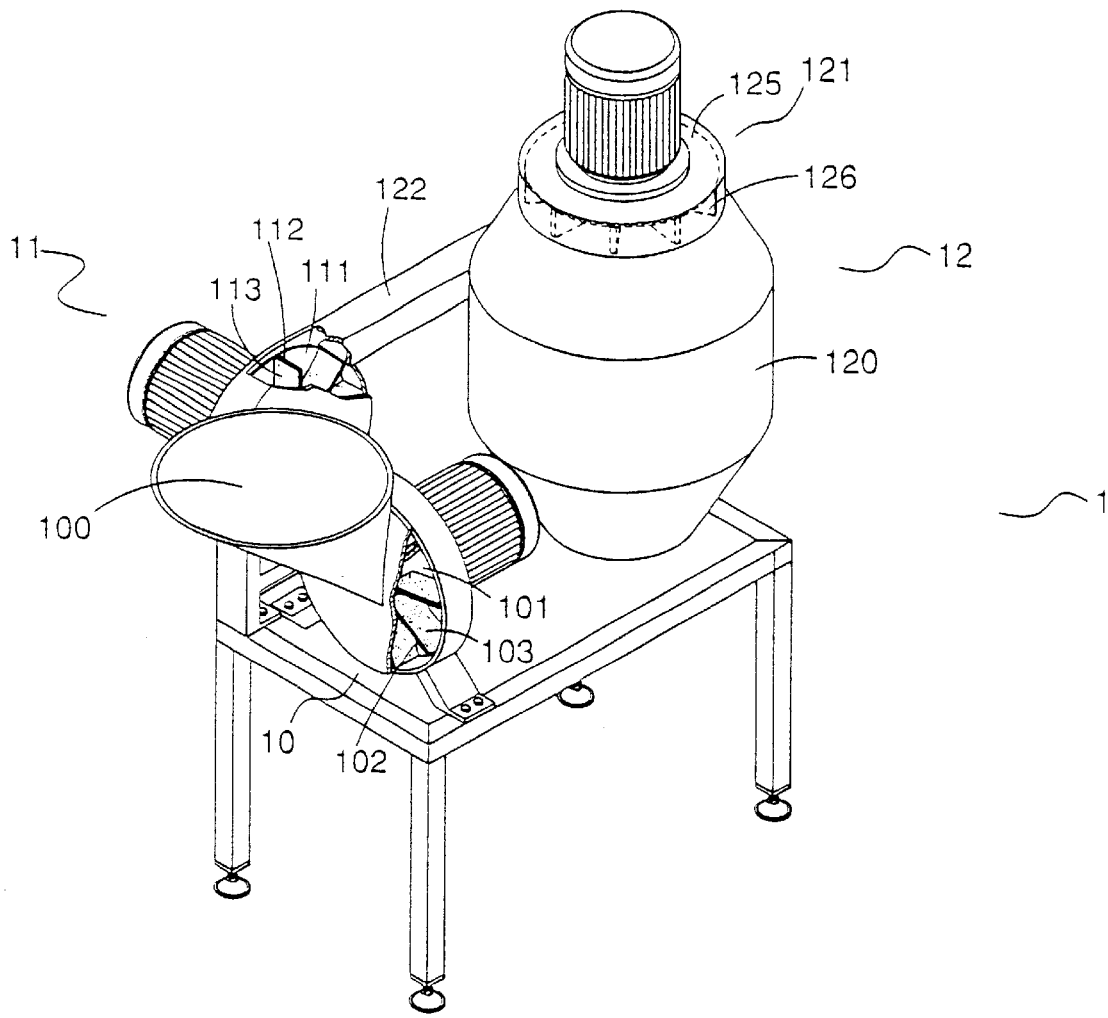
FIG. 2 is a perspective view of the de-husking, bean-halving, membrane removing device of the present invention.
Figure 4:
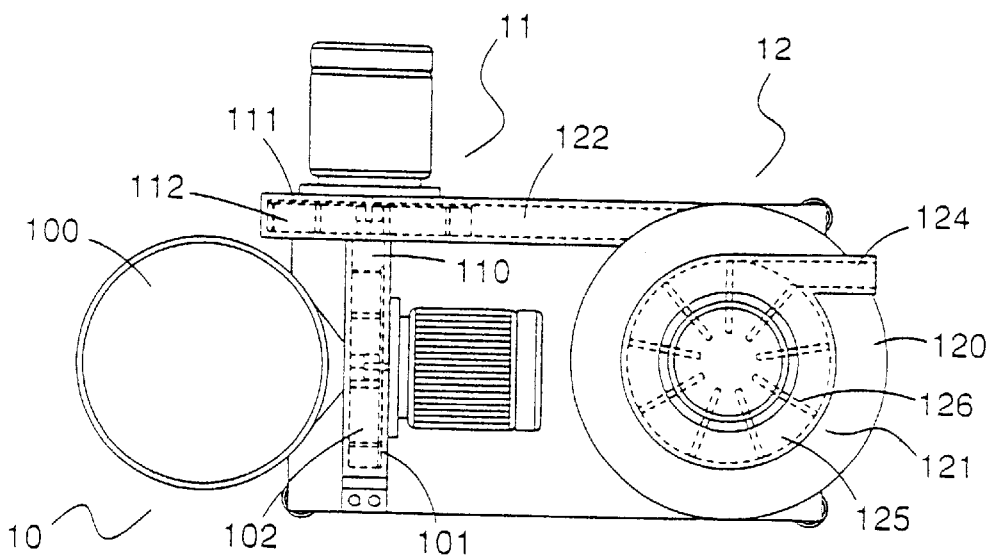
FIG. 4 is the top view of the de-husking, bean-halving, membrane removing device of the present invention.
Figure 3:
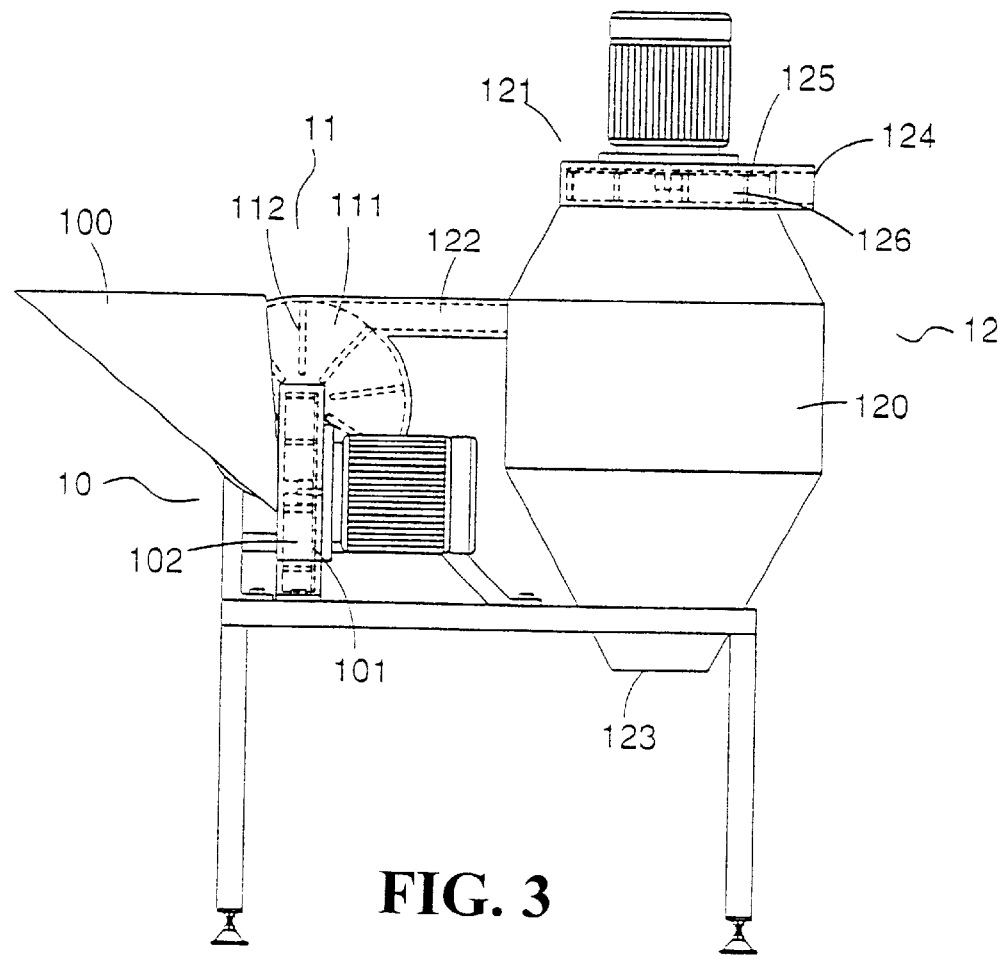
FIG. 3 is the front view of the de-husking, bean-halving, membrane removing device of the present invention.

Referring to FIG. 1, there is shown a processing device for coffee beans, wherein dried coffee beans are undergone a de-husked, bean-halving, membrane-removing device 1 and a roasting device 2 and then are processed to from coffee powder for sale. A transporting device 3 is used to transport coffee beans to a grinding device 4.

Figure 5:
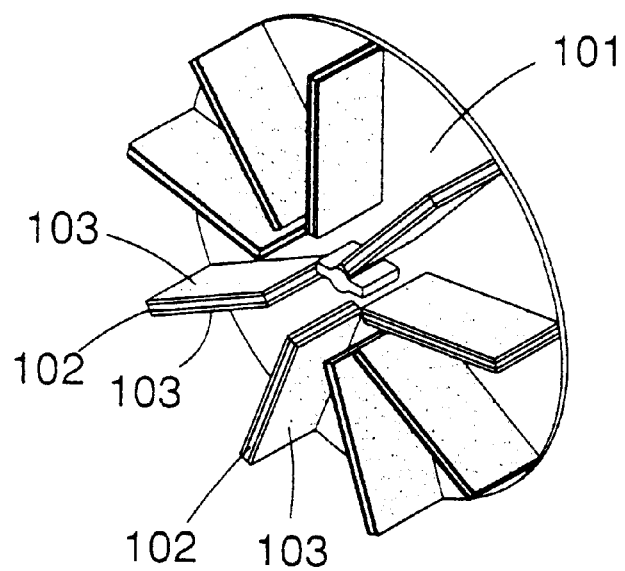
FIG. 5 is a perspective view showing the blade of a first beating device of the present invention.

Referring to FIGS. 2 to 6, the de-husking, bean-halving and membrane-removing device 1 comprises a first beating mechanism 10 provided with a feeding funnel 100 at one side thereof for the feeding of coffee beans and the first beating mechanism 10 is provided with a rotating disc 101 having a plurality of rotating blades 102 with hard rubber 103 at the surface thereof, as shown in FIG. 5.

Figure 6:
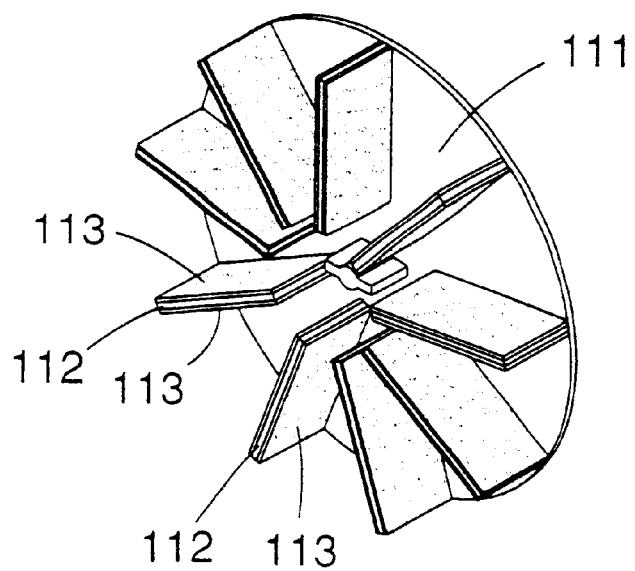
FIG. 6 is a perspective view showing the blade of a second beating device of the present invention.

A second beating mechanism 11 is provided with a first passage 110 in communication with the first beating mechanism 10, and the second beating mechanism 11 having a rotating disc 111 which is provided with a plurality of rotating blades 112 with soft rubber 113 on the surface thereof, as shown in FIG. 6.

A first separating mechanism 12 is a storage tank 120 mounted with a blower 121, and the storage tank 120 is provided with a passage 122 which is in communication with the second beating mechanism 11, and the bottom of the tank 120 is a material outlet 123 for the discharging of coffee bean having being de-husked, bean-halving, and membrane-removing. One side of the blower 121 is provided with a material discharging outlet 124 for discharging of the separated the coffee bean from skin and debris. The blower 125 is provided with a plurality of radially arranged blades 126.

Figure 7:
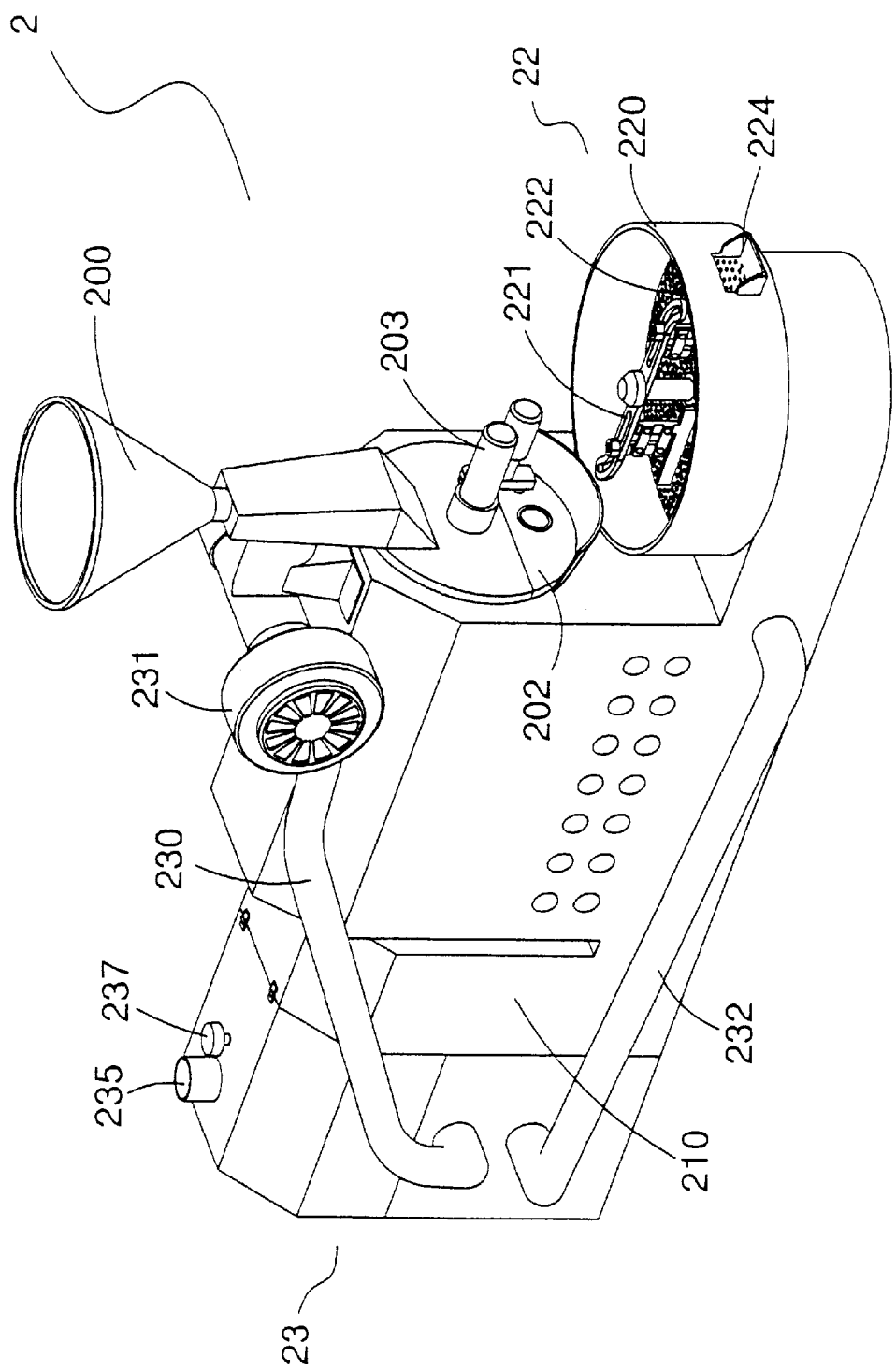
FIG. 7 is a perspective view of the roasting device of the present invention.
Figure 8:
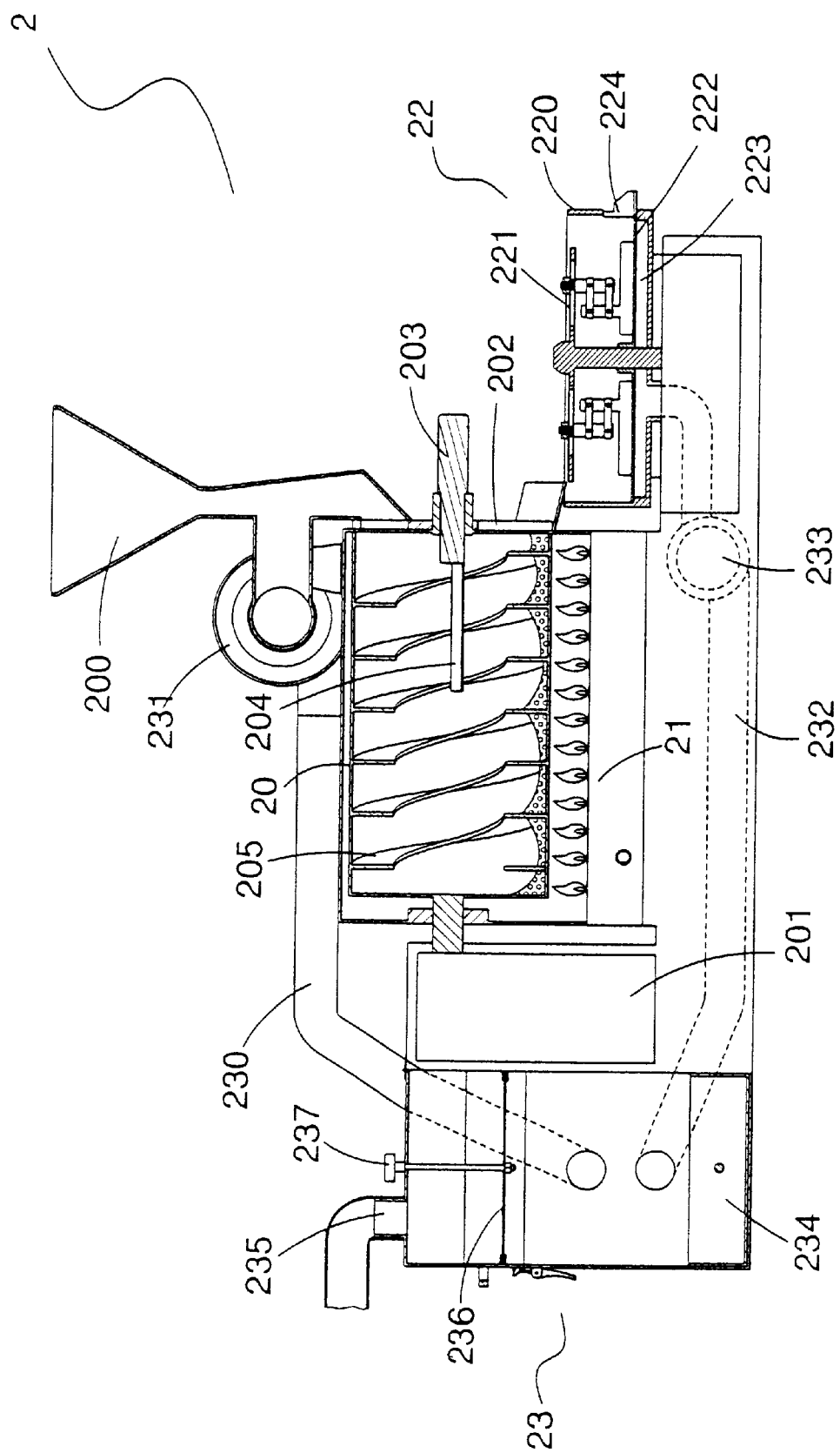
FIG. 8 is a sectional view of the roasting device of the present invention.
Figure 9:
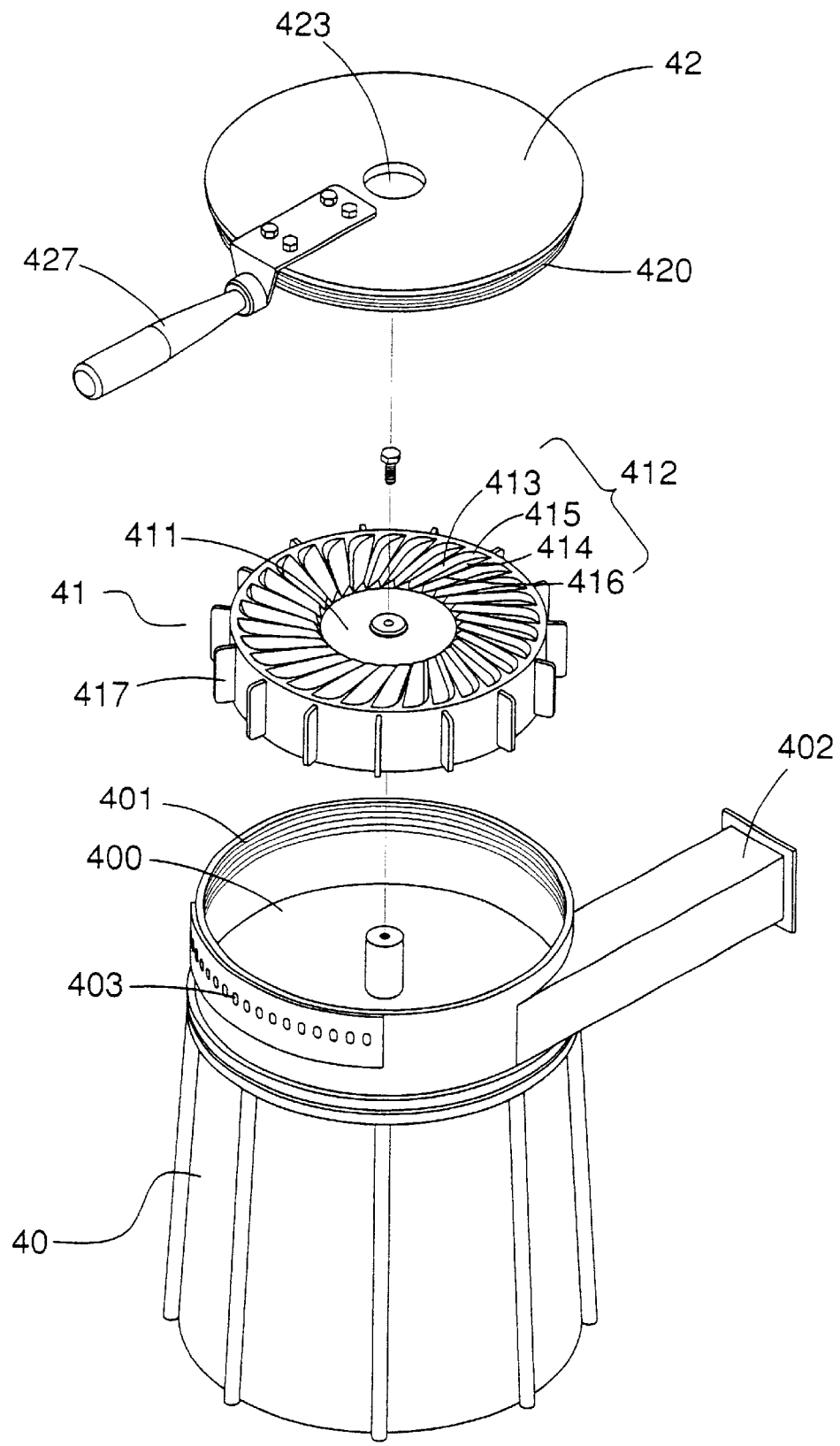
FIG. 9 is a perspective exploded view of the grinding mechanism of the present invention.
Figure 10:
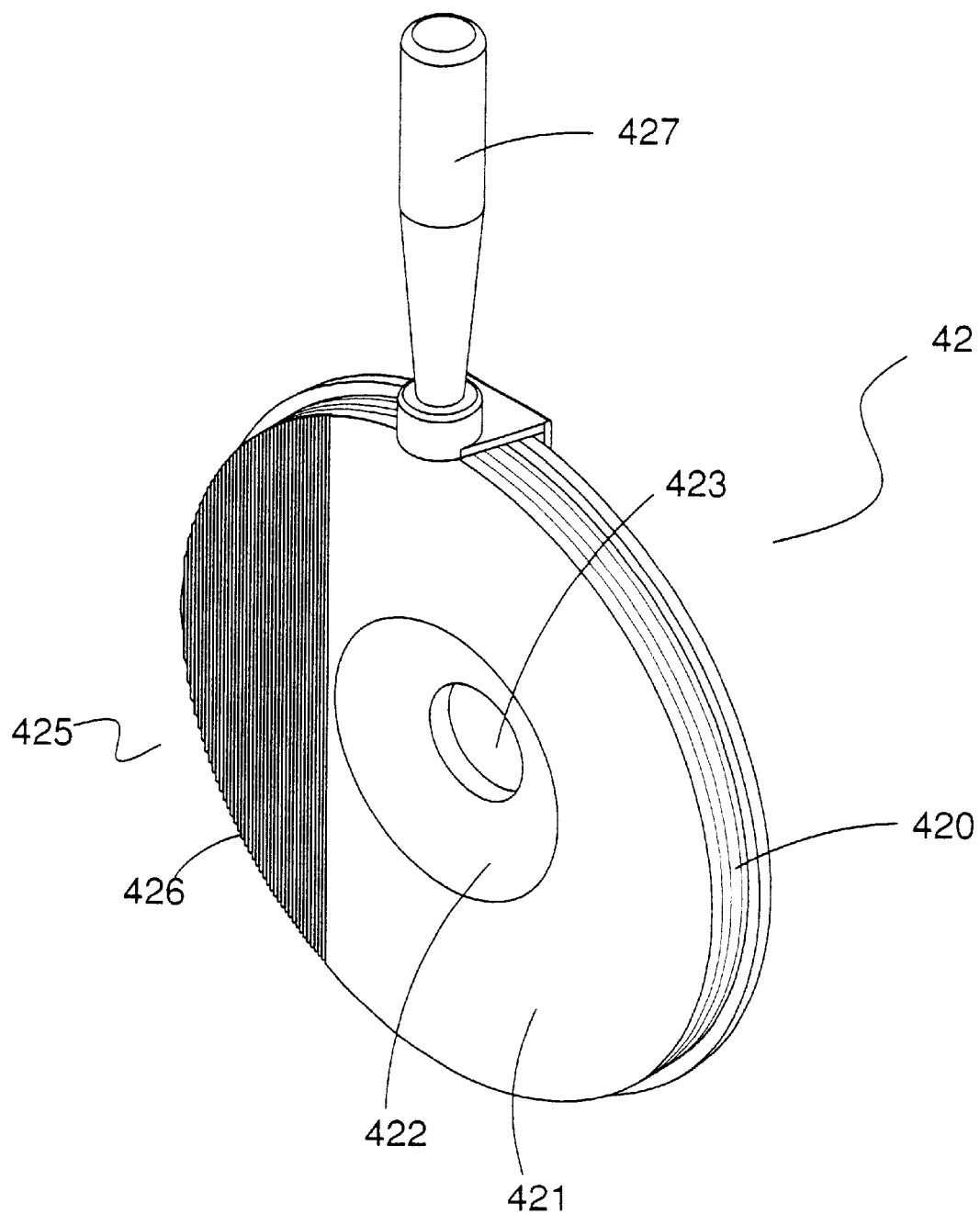
FIG. 10 is a perspective view of the upper grinding disc of the grinding device of the present invention.
Figure 11:
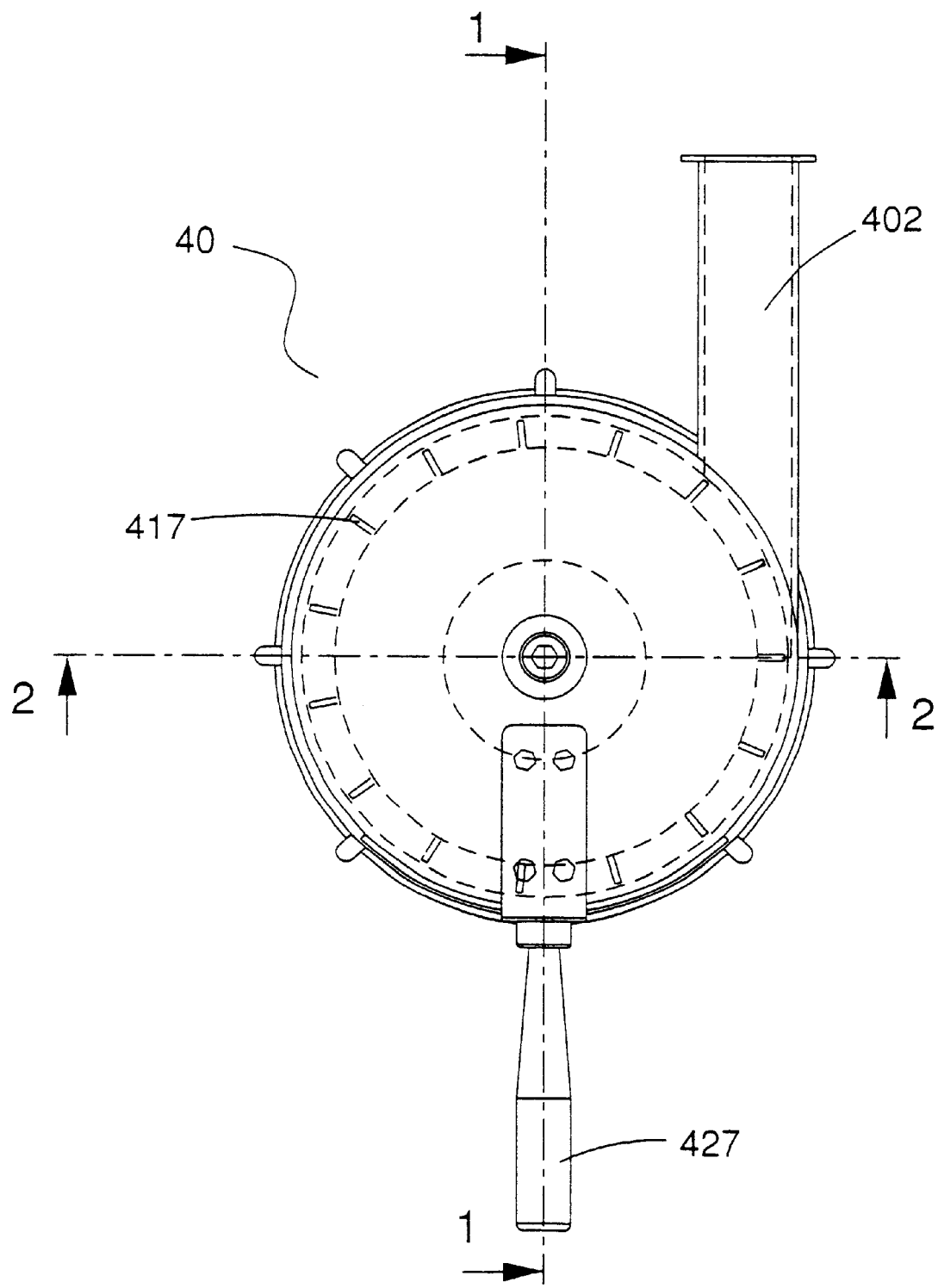
FIG. 11 is the top view of the grinding mechanism of the present invention.

Referring to FIGS. 7 and 8, the roasting device 2 comprises a rolling container 20 having a feeding funnel 200 mounted below the material outlet 123 of the device 1 and the rolling tank 20 is driven by a driving device 201 and one side of the rolling container 20 is provided with a material outlet 203 at one side and the top portion of the material discharging outlet 202 is provided with a material-testing rod 203 extended to the rolling container 20 from the top thereof, and the front end of the material-testing rod 203 is a material accessing slot 204 and the inner wall of the rolling container 20 is provided with two corresponding spiral conductive plates 205 and a burner 21 is provided at the bottom section of the rolling container 20 for heating the bottom section of the rolling container 20.

The cooling device 22 positioned at the lower section of the material outlet 202 includes a stiring tank 220 and a stirring rod 221, and the stirring tank 220 has an opening on the top thereof and the bottom of the tank 220 is provided with a screen 222 to isolate the bottom section thereof into a dust-collecting chamber 223, and one side of the tank 220 is provided with a product outlet 224 and the stirring rod 221 is pivotally mounted to the stiring tank 220 and can be rotated.

A dust filtering device 23 is provided with two connection tubes 230, 232 respectively in communication with the feeding funnel 200 and a cooling device 22. The two connection tubes 230 are provided with a blower 231, 233 and the dust filtering device 23 is provided with a dust-collecting drawer 234 for collection of the remaining debris. The top section of the filtering device 23 is provided with an air outlet 235, which is connected to the connection tube to discharge hot air after filtering to the outside, and the filtering device 22 is provided with a filtering screen 236 having a pulling rod 237 extended to the exterior thereof so as to control the filtering screen 236 to move up or down to remove the collected debris to the drawer 234.

Referring to FIG. 1 and FIGS. 9 to 13, the grinding device 4 includes a coarse mechanism 40 provided with a cavity 400 having an upper edge mounted with a plurality of threads 401, and one side of the cavity 400 is provided with a passage 402 extended to the external thereof, and the cavity 400 is pivotally provided with a lower grinding disc 41 driven to rotate with a driving device 410, and the center of the top face of the lower grinding disc 41 is provided with a recess 411 having the circumferential edge being provided with radially arranged tapered grinding slots 412, and the grinding slot 412 includes a steep-slanting face 413 and a gradually slanting face 414, and the steep slanting face 413 is positioned at the rotating side of the lower grinding disc 41 and the external end section of the steep-slanting face 413 has a material-entering corner 415 with a circular arch, and the neighboring of the steep-slanting face 413 and the gradually slanting face 414 is provided with a sharp downward shearing knife 416, and the circumferential edge of the lower grinding disc 41 is provided with a plurality of upright blades 416, and the circumferential edge at the top of the external edge of the coarse grinding mechanism 40 is provided with a plurality of positioning holes 403, and the upper section of the cavity 400 of the grinding mechanism 40 is provided with an upper grinding disc 42 and the circumferential edge of the upper grinding disc 42 is provided with a plurality of threads 420 for mounting to the inner threads 401 at the upper edge of the cavity 400, and the center of the upper grinding disc 42 corresponding to the lower grinding disc 41 is a material-collecting slot 422 of conic shape, and the material-collecting slot 422 is a material feeding hole 423 in connection to the other side thereof for connection with a feeding funnel 424, and one side of the grinding face 421 is provided with a grinding knife section 425 having a plurality of V-shaped upward shearing knife 426, and one side of the upper grinding disc 42 is an adjustable handle 427 having an end portion provided with a positioning block 428 for engagement to the positioning hole 403, and the upper grinding disc 42 and the lower grinding disc 41 are adjusted to produce a gap smaller than the size of coffee beans.

The second separating device 43 is a tank body 430 having mounted with a blower 431 with a discharging hole 432 at one side to discharge the membrane. The blower 431 is provided with a rotating disc 433 having mounted with a plurality of radially arranged blades 434 and the bottom section of the tank body 430 is a discharging hole 435.

A fine grinding device 44 is similar in structure with that of the coarse grinding device 40 and is provided with a material feeding hole 423 connected to the lower section of the discharging hole 435 and the fine grinding mechanism 44 changes the gap between the upper grinding disc 42 and the lower grinding disc 41.

Referring to FIGS. 1 to 4, the coffee bean fruit is poured into the first beating device 10 via the feeding funnel 100. At this device, the husk of the coffee bean fruit is separated and the beans are halved. When the coffee beans enter the second beating device 11, the blade surface will bean the coffee bean until the membrane of coffee beans is removed and via the passage 122 to the storage tank 120. The discharge hole 123 will only discharge clean coffee bean.

As shown in FIG. 1 and 7 and 8, the clean coffee beans are undergone the roasting device 2 via the funnel 200 into the rolling container 20 which is rotated by the driving device 201 the burner 21 below the container 20 causes the coffee to roast and the testing rod 203 is used to test the maturity of the roasting process. The roasted coffee beans are discharged to the stirring tank 220 for stirring by the stirring rod 221 for cooling. The product is discharged via the product discharging hole 224 for packaging and delivery for sales or via a grinding device 4 to form coffee powder.

Referring to FIGS. 1 and 9 to 13, the coffee beans are cut by the upper shearing knife 426 and the lower shearing knife 416 and centrifuged to the slanting face 414 and 415. The coarse grounded coffee is transported to the fine grinding mechanism 44.

Figure 12:
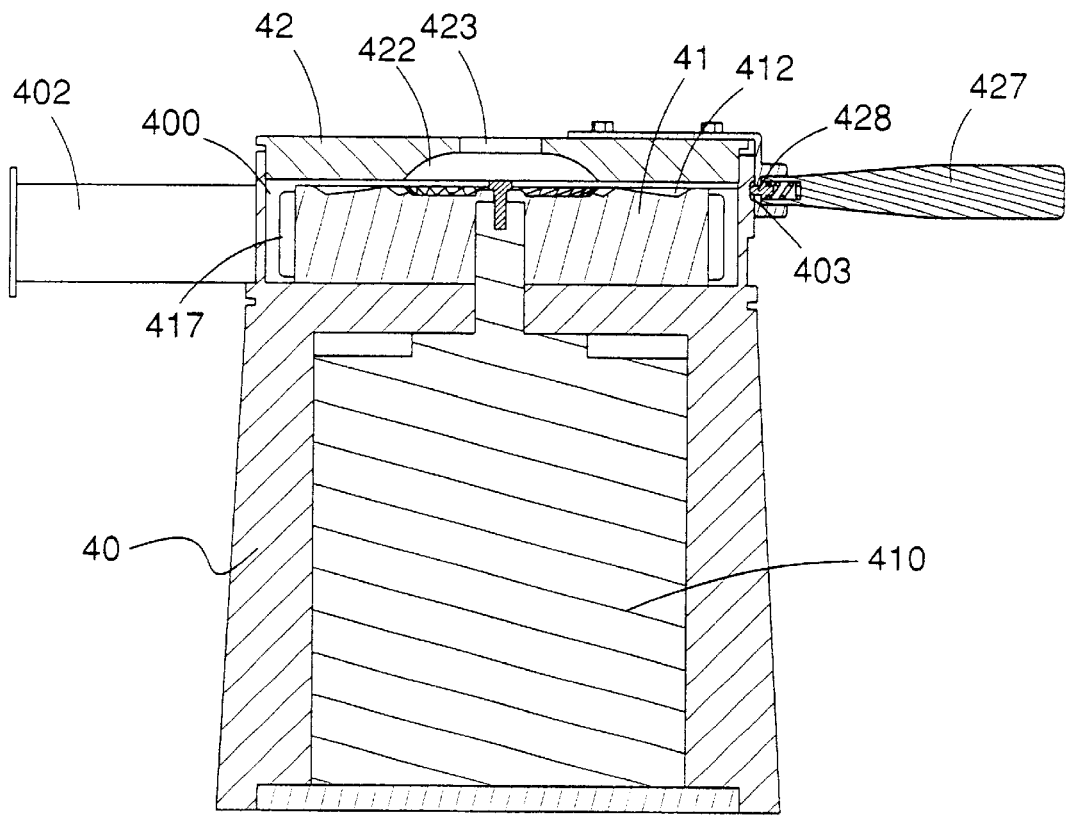
FIG. 12 is a sectional view along 1—1 of FIG. 11 of the present invention.
Figure 13:
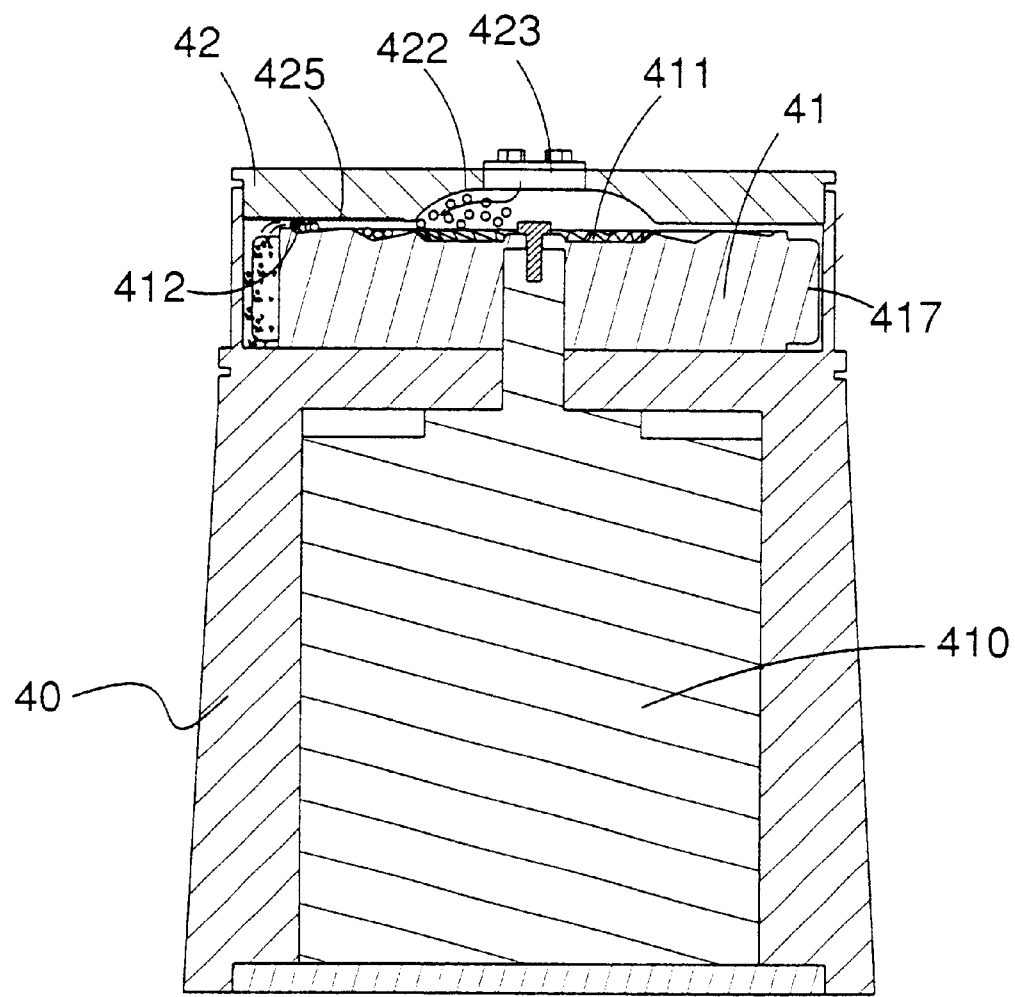
FIG. 13 is a sectional view along 2—2 of FIG. 11 of the present invention.

As shown in FIG. 1 and 12, the structure of the fine grinding mechanism 44 is similar to that of the coarse grinding mechanism 44 and the fine grinding mechanism 44 uses an adjusting handle 427 to adjust the upper grinding disc 42 and the lower grinding disc 41. The reverse rotating of the handle 427 will provide a big gap.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A processing device for coffee beans to undergo a de-husking, bean-halving, membrane removing and roasting device to proceed with a de-husking, bean-halving, membrane removing and roasting step of coffee beans, wherein the de-husking, bean-halving and membrane-removing device comprises:

a first beating mechanism having a plurality of rotating blades with hard rubber at the surface thereof to beat and remove the dried husk, flesh and inner skin of coffee beans;

a second beating mechanism having a plurality of rotating blades with soft rubber at the surface thereof to beat and remove the silvery skin of the inner layer of the bean;

a first separating mechanism mounted with a blower for separating the coffee bean from skin and debris; and the roasting device including a rolling container mounted with a spiral conductive plate and a burner at the bottom section of the rolling container for roasting of coffee beans after the coffee beans have been de-husked, halved and membrane-removed for appropriate stirring for evenly roasting.

2. A processing device for coffee beans to undergo a de-husking, bean-halving, membrane removing and roasting device to proceed with a de-husking, bean-halving, membrane removing and roasting step of coffee beans, wherein the de-husking, bean-halving and membrane-removing device comprises:

a first beating mechanism having a plurality of rotating blades with hard rubber at the surface thereof to beat and remove the dried husk, flesh and inner skin of coffee beans;

a second beating mechanism having a plurality of rotating blades with soft rubber at the surface thereof to beat and remove the silvery skin of the inner layer of the bean;

a first separating mechanism mounted with a blower for separating the coffee bean from skin and debris;

the roasting device including a rolling container mounted with a spiral conductive plate and a burner at the bottom section of the rolling container for roasting of coffee beans after the coffee beans have been de-husked, halved and membrane-removed for appropriate stirring for evenly roasting;

the grinding device including:

a coarse grinding mechanism having an upper and lower grinding disc and a gap being formed by the upper and lower grinding disc to grind coffee beans into coarse granules and to remove the thin membrane adhered to the coffee beans;

a second separating mechanism having a blower which can separate crushed granules of the coffee and the thin membrane;

a fine grinding mechanism having an upper and lower grinding disc and a gap being formed by the upper and lower grinding disc to form a small gap to grind the crushed granules into fine powder.

3. The fabricating device of claim 1, wherein the first beating mechanism is mounted with a material feeding funnel at one side thereof and a rotating plate having a plurality of radially arranged blades with hard rubber on the surface thereof.

4. The fabricating device of claim 1, wherein the second beating mechanism is provided with a passage in communication with the first beating mechanism, and the second beating mechanism is provided with a rotating plate having a plurality of radially arranged blades with hard rubber on the surface thereof.

5. The fabricating device of claim 1, wherein the first separating mechanism is a storage tank mounted with a blower, and the storage tank is provided with a passage which is in communication with the second beating mechanism and the bottom portion is a material-outlet, and one side of the blower is a material discharging port at one side and the blower is provided with a rotating rotatable disc having a plurality of radially arranged blades.

6. The fabricating device of claim 1, wherein the rolling container is driven to rotate by a driving device, and one side of the rolling container is provided with a material outlet having a material-testing rod extended to the rolling container from the top thereof, the front end of the material-testing rod is a material accessing slot and the inner wall of the rolling container is provided with two corresponding spiral conductive plates and the lower section of the material outlet is provided with a cooling device.

7. The fabricating device of claim 6, wherein the cooling device includes a stirring tank and a stirring rod, and the stirring tank has an opening on the top thereof and the bottom of the tank is provided with a screen to isolate the bottom section thereof into a dust-collecting chamber, and one side of the tank is provided with a product outlet and the stirring rod is pivotally mounted to the stirring tank and can be rotated.

8. The fabricating device of claim 6, wherein the feeding funnel and the cooling device are respectively mounted with a connection pipe connecting to a dust filtering device and the two connection pipes are respectively mounted with a blower.

9. The fabricating device of claim 8, wherein the bottom section of the dust filtering device is provided with a drawer and the top section of the filtering device is provided with an air outlet, which connected to the connection tube to discharge hot air after filtering to the outside, and the filtering device is provided with a filtering screen having a pulling rod extended to the exterior thereof.

10. The fabricating device of claim 1, wherein the coffee beans after roasted by the roasting device are transported to a grinding device via a transporting device to grind into coffee powder for sales.

11. The fabricating device of claim 2, wherein the coarse mechanism is provided with a cavity having an upper edge mounted with a plurality of threads, and one side of the cavity is provided with a passage extended to the external thereof, and the cavity is pivotally provided with a lower grinding disc driven to rotate with a driving device, and the center of the top face of the lower grinding disc is provided with a recess having the circumferential edge being provided with radially arranged tapered grinding slots, and the grinding slot includes a steep-slanting face and a gradually slanting face, and the steep slanting face is positioned at the rotating side of the lower grinding disc and the external end section of the steep-slanting face has a material-entering corner with a circular arch, and the neighboring of the steep-slanting face and the gradually slanting face is provided with a sharp downward shearing knife, and the circumferential edge of the lower grinding disc is provided with a plurality of upright blades, and the circumferential edge at the top of the external edge of the coarse grinding mechanism is provided with a plurality of positioning holes, and the upper section of the cavity of the grinding mechanism is provided with an upper grinding disc and the circumferential edge of the upper grinding disc is provided with a plurality of threads for mounting to the inner threads at the upper edge of the cavity, and the center of the upper grinding disc corresponding to the lower grinding disc is a material-collecting slot of conic shape, and the material-collecting slot is a material feeding hole in connection to the other side thereof for connection with a feeding funnel, and one side of the grinding face is provided with a grinding knife section having a plurality of V-shaped upward shearing knife, and one side of the upper grinding disc is an adjustable handle having an end portion provided with a positioning block for engagement to the positioning hole, and the upper grinding disc and the lower grinding disc are adjusted to produce a gap smaller than the size of coffee beans.

12. The fabricating device of claim 2, wherein the second separating mechanism is a tank body having a blower, and one side of the blower is provided with a material discharging outlet and the blower is provided with a rotating disc having mounted radially with a plurality of blades, and the bottom section of the tank body is provided with a material-discharging outlet.

13. The fabricating device of claim 2, wherein the fine grinding mechanism is provided a cavity having an upper edge mounted with a plurality of threads, and one side of the cavity is provided with a passage extended to the external thereof, and the cavity is pivotally provided with a lower grinding disc driven to rotate with a driving device, and the center of the top face of the lower grinding disc is provided with a recess having the circumferential edge being provided with radially arranged tapered grinding slots, and the grinding slot includes a steep-slanting face and a gradually slanting face, and the steep slanting face is positioned at the rotating side of the lower grinding disc and the external end section of the steep-slanting face has a material-entering corner with a circular arch, and the neighboring of the steep-slanting face and the gradually slanting face is provided with a sharp downward shearing knife, and the circumferential edge of the lower grinding disc is provided with a plurality of upright blades, and the circumferential edge at the top of the external edge of the coarse grinding mechanism is provided with a plurality of positioning holes, and the upper section of the cavity of the grinding mechanism is provided with an upper grinding disc and the circumferential edge of the upper grinding disc is provided with a plurality of threads for mounting to the inner threads at the upper edge of the cavity, and the center of the upper grinding disc corresponding to the lower grinding disc is a material-collecting slot of conic shape, and the material-collecting slot is a material feeding hole in connection to the other side thereof for connection with a feeding funnel, and one side of the grinding face is provided with a grinding knight section having a plurality of V-shaped upward shearing knife, and one side of the upper grinding disc is an adjustable handle having an end portion provided with a positioning block for engagement to the positioning hole, and the upper grinding disc and the lower grinding disc are adjusted to produce a gap smaller dan the size of coffee beans.

* * * * *